United States Patent
Shao

(10) Patent No.: US 10,637,355 B1
(45) Date of Patent: Apr. 28, 2020

(54) SWITCHED CAPACITOR VOLTAGE CONVERTER AND METHOD FOR OPERATING A SWITCHED CAPACITOR VOLTAGE CONVERTER

(71) Applicant: NXP B.V., Eindhoven (NL)

(72) Inventor: Bin Shao, Chandler, AZ (US)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 16/409,658

(22) Filed: May 10, 2019

(51) Int. Cl.
    *H02M 3/158* (2006.01)
    *H02M 1/084* (2006.01)

(52) U.S. Cl.
    CPC ........... *H02M 3/158* (2013.01); *H02M 1/084* (2013.01); *H02M 2003/1586* (2013.01)

(58) Field of Classification Search
    CPC ...... H02M 3/155; H02M 3/156; H02M 3/157; H02M 3/158; H02M 1/084; H02M 1/0845; H02M 1/088; H02M 2003/1586
    See application file for complete search history.

(56) References Cited

U.S. PATENT DOCUMENTS

| | | | |
|---|---|---|---|
| 7,612,603 B1* | 11/2009 | Petricek | H02M 3/07 307/109 |
| 8,710,903 B2 | 4/2014 | Oraw et al. | |
| 9,419,509 B2 | 8/2016 | Jarvinen et al. | |
| 10,014,775 B1 | 7/2018 | Assaad et al. | |
| 2015/0311792 A1* | 10/2015 | Amaro | H02M 1/08 323/271 |
| 2017/0126120 A1* | 5/2017 | Chakraborty | H02M 3/158 |
| 2018/0004238 A1* | 1/2018 | Shen | G05F 1/462 |
| 2019/0028094 A1* | 1/2019 | Reusch | H03K 17/063 |

OTHER PUBLICATIONS

"NXP Type-C End-to-End Fast Charging 8 A Total Solution", Document No. E2EFAST8ATOTAL, REV 0, 2 pages, 2018.
Analog Devices, "Fixed Ratio High Power Inductorless (Charge Pump) DC/DC Controller", Datasheet LTC7820, https://www.analog.com/en/products/ltc7820.html, retrieved from the Internet, Apr. 30, 2019, 28 pages.
Non Final Office Action; U.S. Appl. No. 16/409,644 6 pages (dated Mar. 11, 2020).

\* cited by examiner

*Primary Examiner* — Adolf D Berhane

(57) ABSTRACT

Embodiments of switched capacitor voltage converters and methods for operating a switched capacitor voltage converter are disclosed. In an embodiment, a switched capacitor voltage converter includes serially connected switching devices, a voltage generator connected to the serially connected switching devices and configured to generate an output voltage for a bootstrap capacitor in response to a first voltage at a first terminal that is connected to the serially connected switching devices, and voltage drivers configured to drive the serially connected switching devices based on the output voltage.

20 Claims, 8 Drawing Sheets

SWITCHED CAPACITOR VOLTAGE CONVERTER AND METHOD FOR OPERATING A SWITCHED CAPACITOR VOLTAGE CONVERTER

BACKGROUND

A voltage converter can be used to convert an input voltage into a desired output voltage. For example, a direct current (DC)-DC converter can be used to convert an input DC voltage into a desired output DC voltage. A switched capacitor voltage converter may use a combination of one or more switching devices and one or more capacitors to convert an input voltage into a desired output voltage. However, extra capacitors take up additional substrate area, may increase component costs, and may require more electrical terminals (e.g., pins) in a packaged semiconductor chip.

SUMMARY

Embodiments of switched capacitor voltage converters and methods for operating a switched capacitor voltage converter are disclosed. In an embodiment, a switched capacitor voltage converter includes serially connected switching devices, a voltage generator connected to the serially connected switching devices and configured to generate an output voltage for a bootstrap capacitor in response to a first voltage at a first terminal that is connected to the serially connected switching devices, and voltage drivers configured to drive the serially connected switching devices based on the output voltage. Other embodiments are also described.

In an embodiment, the voltage drivers includes a first voltage driver configured to drive a first switching device of the serially connected switching devices based on the output voltage, second and third voltage drivers configured to drive second and third switching devices of the serially connected switching devices based on the first voltage, and a fourth voltage driver configured to drive a fourth switching device of the serially connected switching devices based on a second voltage that is derived from the first voltage.

In an embodiment, the first, second, third, and fourth voltage drivers are connected to gate terminals of the first, second, third, and fourth switching devices respectively.

In an embodiment, the switched capacitor voltage converter comprises the bootstrap capacitor.

In an embodiment, the bootstrap capacitor is connected to a second terminal connected to the voltage generator and to the first voltage drive and to a third terminal connected to a source terminal of the first switching device and to a drain terminal of the second switch device.

In an embodiment, the voltage drivers include first, second, and third voltage drivers configured to drive first, second and third switching devices of the serially connected switching devices based on the output voltage, and a fourth voltage driver configured to drive a fourth switching device of the serially connected switching devices based on a second voltage that is derived from the first voltage.

In an embodiment, the first, second, third, and fourth voltage drivers are connected to gate terminals of the first, second, third, and fourth switching devices respectively.

In an embodiment, the switched capacitor voltage converter includes the bootstrap capacitor.

In an embodiment, the bootstrap capacitor is connected to a second terminal connected to the voltage generator and to the first voltage driver, and to a third terminal connected to a source terminal of the first switching device and to a drain terminal of the second switch device.

In an embodiment, the voltage drivers include a first voltage driver configured to drive a first switching device of the serially connected switching devices based on the output voltage, a second voltage driver configured to drive a second switching device of the serially connected switching devices based on the first voltage, a third voltage driver configured to drive a third switching device of the serially connected switching devices based on a second voltage that is derived from the first voltage, and a fourth voltage driver configured to drive a fourth switching device of the serially connected switching devices based on a third voltage that is derived from the first voltage.

In an embodiment, the third voltage is an output voltage of the switched capacitor voltage converter.

In an embodiment, the first, second, third, and fourth voltage drivers are connected to gate terminals of the first, second, third, and fourth switching devices respectively.

In an embodiment, the switched capacitor voltage converter comprises the bootstrap capacitor.

In an embodiment, the bootstrap capacitor is connected to a second terminal connected to the voltage generator and to the first voltage driver and to a third terminal connected to a source terminal of the first switching device and to a drain terminal of the second switch device.

In an embodiment, the voltage generator comprises a voltage limiter and a diode.

In an embodiment, a switched capacitor voltage converter includes serially connected N-type transistors, a bootstrap capacitor connected to a first N-type transistor of the serially connected N-type transistors, a voltage generator connected to the serially connected N-type transistors and to the bootstrap capacitor and configured to generate an output voltage for the bootstrap capacitor in response to a first voltage at a first terminal that is connected to the serially connected N-type transistors, and voltage drivers configured to drive the serially connected N-type transistors based on the output voltage, wherein the voltage drivers comprise a first voltage driver configured to drive the first N-type transistor based on the output voltage.

In an embodiment, the voltage drivers include second and third voltage drivers configured to drive second and third N-type transistors of the serially connected N-type transistors based on the first voltage and a fourth voltage driver configured to drive a fourth N-type transistor of the serially connected N-type transistors based on a second voltage that is derived from the first voltage.

In an embodiment, the voltage drivers include second and third voltage drivers configured to drive second and third N-type transistors of the serially connected N-type transistors based on the output voltage, and a fourth voltage driver configured to drive a fourth N-type transistor of the serially connected N-type transistors based on a second voltage that is derived from the first voltage.

In an embodiment, the voltage drivers include a second voltage driver configured to drive a second N-type transistor of the serially connected N-type transistors based on the first voltage, a third voltage driver configured to drive a third N-type transistor of the serially connected N-type transistors based on a second voltage that is derived from the first voltage, and a fourth voltage driver configured to drive a fourth N-type transistor of the serially connected N-type transistors based on a third voltage that is derived from the first voltage.

In an embodiment, a method for operating a switched capacitor voltage converter involves generating an output voltage for a bootstrap capacitor connected to serially connected switching devices of the switched capacitor voltage converter in response to a voltage at a terminal that is connected to the serially connected switching devices and driving the serially connected switching devices based on the output voltage.

Other aspects in accordance with the invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

Figure 1:
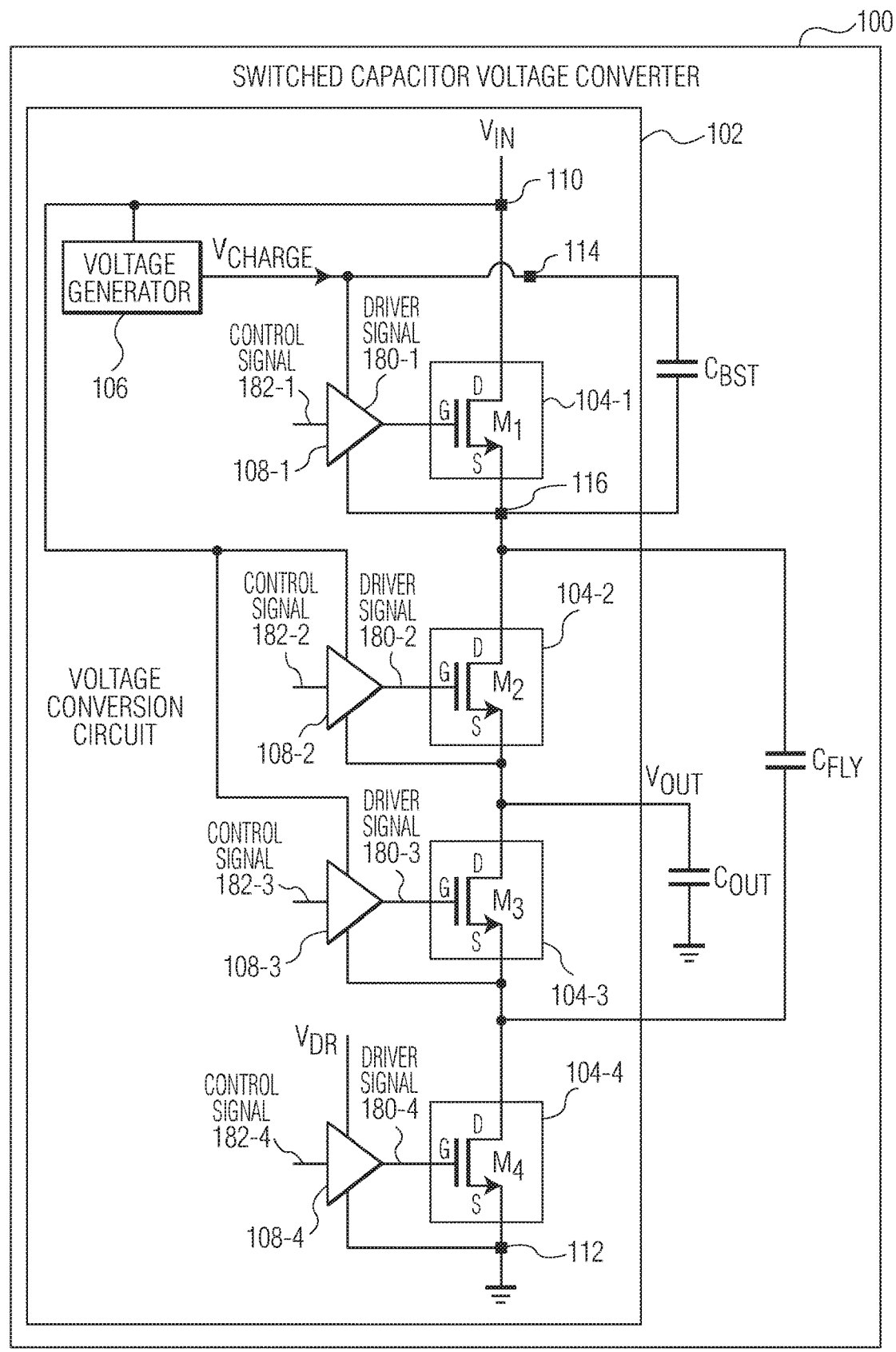
FIG. 1 is a schematic block diagram of a switched capacitor voltage converter in accordance with a first embodiment of the invention.

FIG. 1 is a schematic block diagram of a switched capacitor voltage converter 100 in accordance with a first embodiment of the invention. The switched capacitor voltage converter converts an input voltage, $V_{IN}$, into a desired output voltage, $V_{OUT}$. The switched capacitor voltage converter can be used in various applications, such as automotive applications, communications applications, industrial applications, medical applications, computer applications, and/or consumer or appliance applications. In the embodiment depicted in FIG. 1, the switched capacitor voltage converter includes a voltage conversion circuit 102, a bootstrap capacitor, "$C_{BST}$," a flyover capacitor, "$C_{FLY}$," and an output capacitor, "$C_{OUT}$." The voltage conversion circuit 102 includes serially connected switching devices 104-1, 104-2, 104-3, 104-4, a voltage generator 106 connected to the serially connected switching devices, and voltage drivers 108-1, 108-2, 108-3, 108-4. The flyover capacitor, $C_{FLY}$, and the output capacitor, $C_{OUT}$, may be external capacitors to the voltage conversion circuit. In some embodiments, the switched capacitor voltage converter is included in a computing device, such as a smartphone, a tablet computer, a laptop, etc. In some embodiments, at least some of the components of the switched capacitor voltage converter are implemented in a substrate, such as a semiconductor wafer or a printed circuit board (PCB). In an embodiment, at least some of the components of the switched capacitor voltage converter are packaged as a stand-alone semiconductor IC chip. Although the switched capacitor voltage converter is shown in FIG. 1 as including certain circuit elements, in other embodiments, the switched capacitor voltage converter may include one or more additional circuit elements. For example, the switched capacitor voltage converter may include more than four switching devices or less than four switching devices in other embodiments. In another example, the switched capacitor voltage converter may include more than four voltage drivers or less than four voltage drivers in other embodiments.

In some embodiments, the voltage conversion circuit 102 is implemented in a substrate and is packaged as a stand-alone semiconductor IC device or chip. In these embodiments, the bootstrap capacitor, "$C_{BST}$" is an external capacitor to the voltage conversion circuit. For example, N-type high voltage transistors, e.g., N-channel lateral diffused MOS (NLDMOS) transistors, can be used in the voltage conversion circuit for better power efficiency. However, due to the size of N type transistors, bootstrap capacitors are typically not integrated with these transistors (i.e., integrated onto the same substrate as the transistors). In a conventional switched capacitor voltage converter, each switching device of a voltage conversion circuit is electrically connected to a separate bootstrap capacitor. Consequently, multiple external bootstrap capacitors are used in a conventional switched capacitor voltage converter. However, extra bootstrap capacitors occupy additional substrate area, may add component costs, and may require more electrical terminals (e.g., pins) in a packaged voltage conversion circuit, which can increase the dimensions as well as the component cost of the packaged voltage conversion circuit. For example, for a single-phase switched capacitor voltage converter in which each switching device of a voltage conversion circuit is electrically connected to a separate bootstrap capacitor, three external capacitors and three extra terminals (e.g., pins) may be needed. For a dual-phase switched capacitor voltage converter in which each switching device of a voltage conversion circuit is electrically connected to a separate bootstrap capacitor, five external capacitors and five extra terminals (e.g., pins) are used for the voltage conversion circuit, even assuming the middle bootstrap capacitor is reused. In contrast, the voltage conversion circuit 102 of the switched capacitor voltage converter 100 depicted in FIG. 1 uses one bootstrap capacitor, $C_{BST}$. Consequently, compared to a switched capacitor voltage converter in which each switching device of a voltage conversion circuit is electrically connected to a separate bootstrap capacitor, the switched capacitor voltage converter 100 depicted in FIG. 1 uses less bootstrap capacitors. In addition, compared to a voltage conversion circuit of a switched capacitor voltage converter in which each switching device of the voltage conversion circuit is electrically connected to a separate bootstrap capacitor, the voltage conversion circuit 102 depicted in FIG. 1 does not need as many as terminals (e.g., pins) for connecting to the additional bootstrap capacitors. Consequently, compared to a switched capacitor voltage converter in which each switching device of a voltage conversion circuit is electrically connected to a separate bootstrap capacitor, the switched capacitor voltage converter 100 depicted in FIG. 1 can have smaller dimension and lower component cost.

In the embodiment depicted in FIG. 1, the serially connected switching devices 104-1, 104-2, 104-3, 104-4 are electrically connected to a terminal 110 having the input voltage, $V_{IN}$, and to a terminal 112 having a reference voltage that is lower than the input voltage, $V_{IN}$. In some embodiments, the reference voltage is ground (0 volt). In the embodiment depicted in FIG. 1, the serially connected switching devices are implemented as N-type transistors, M1, M2, M3, M4, such as, NLDMOS transistors, for better power efficiency. However, in other embodiments, the switching devices may be implemented by other semiconductor devices.

In the embodiment depicted in FIG. 1, the voltage generator 106 is electrically connected to the serially connected switching devices 104-1, 104-2, 104-3, 104-4 and configured to generate an output voltage, $V_{CHARGE}$, for the bootstrap capacitor, $C_{BST}$, in response to the input voltage, $V_{IN}$, at the terminal 110. The bootstrap capacitor, $C_{BST}$, can be charged or refreshed from the input voltage, $V_{IN}$, when the transistor, M1, is turned off (i.e., not conductive). In the embodiment depicted in FIG. 1, the bootstrap capacitor, $C_{BST}$, is connected to a terminal 114 connected to the voltage generator and to the voltage driver 108-1 and to a terminal 116 connected to a source terminal, S, of the transistor, M1, and to a drain terminal, D, of the transistor, M2. In an example operation, the bootstrap capacitor, $C_{BST}$, is refreshed every clock switching cycle. The bootstrap capacitor, $C_{BST}$, is charged when the transistors M2 and M4 are turned on (conductive) and the transistors M1 and M3 are turned off (non-conductive), and is discharged when the transistors M1 and M3 are turned on (conductive) and the transistors M2 and M4 are turned off (non-conductive). In some embodiments, the bootstrap capacitor, $C_{BST}$, has a capacitance value that is between 0.1 μF and 1 μF, the flyover capacitor, $C_{FLY}$, has a capacitance value that is between 1 μF and 100 μF, and the output capacitor, $C_{OUT}$, has a capacitance value that is between 1 μF and 100 μF.

Figure 2:
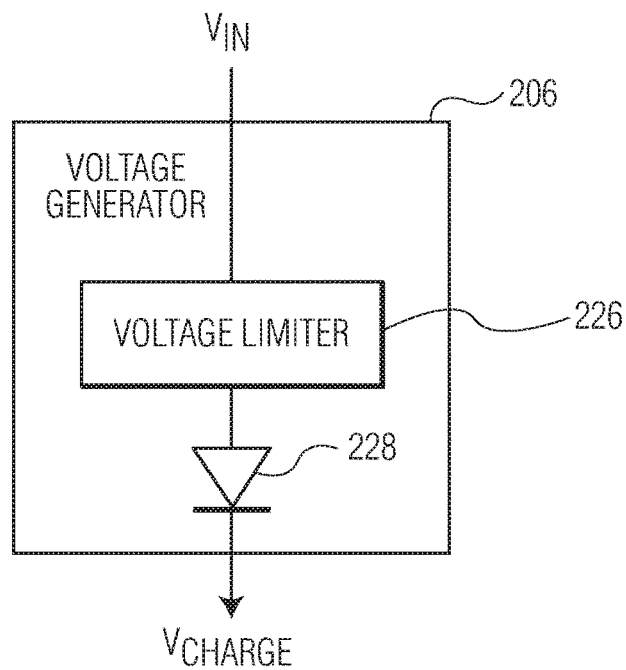
FIG. 2 depicts an embodiment of a voltage generator of the switched capacitor voltage converter depicted in FIG. 1.

FIG. 2 depicts a voltage generator 206, which is an embodiment of the voltage generator 106 depicted in FIG. 1. The voltage generator 206 depicted in FIG. 2 is one possible embodiment of the voltage generator 106 depicted in FIG. 1. However, the voltage generator 106 depicted in FIG. 1 is not limited to the embodiment shown in FIG. 2. In the embodiment depicted in FIG. 2, the voltage generator 206 includes a voltage limiter 226 such as a voltage divider and a diode 228. In some embodiments, the output voltage of the voltage limiter is a fraction of the input voltage, $V_{IN}$, for example, one half of the input voltage, $V_{IN}$.

Turning back to FIG. 1, the voltage drivers 108-1, 108-2, 108-3, 108-4 are configured to drive the switching devices 104-1, 104-2, 104-3, 104-4 with driver signals 180-1, 180-2, 180-3, 180-4 in response to control signals 182-1, 182-2, 182-3, 182-4. The voltage driver 108-1 is configured to drive the transistor, M1, based on the output voltage, $V_{CHARGE}$, which is generated by the voltage generator 106. The voltage drivers 108-2, 108-3 are configured to drive the transistors, M2, M3, based on the input voltage, $V_{IN}$. The voltage driver 108-4 is configured to drive the transistor, M4, of based on a driver voltage, $V_{DR}$, which is derived from the input voltage, $V_{IN}$. The driver voltage, $V_{DR}$, may be generated by a component within the switched capacitor voltage converter 100, such as a voltage divider configured to generate an output voltage that is a fraction of the input voltage, $V_{IN}$. When the serially connected switching devices are implemented as N-type transistors, M1, M2, M3, M4, the voltage drivers 108-1, 108-2, 108-3, 108-4 are electrically connected to gate terminals, G, of the transistors, M1, M2, M3, M4, respectively. The voltage drivers 108-1, 108-2, 108-3, 108-4 can be implemented using known driver circuits.

Figure 3:
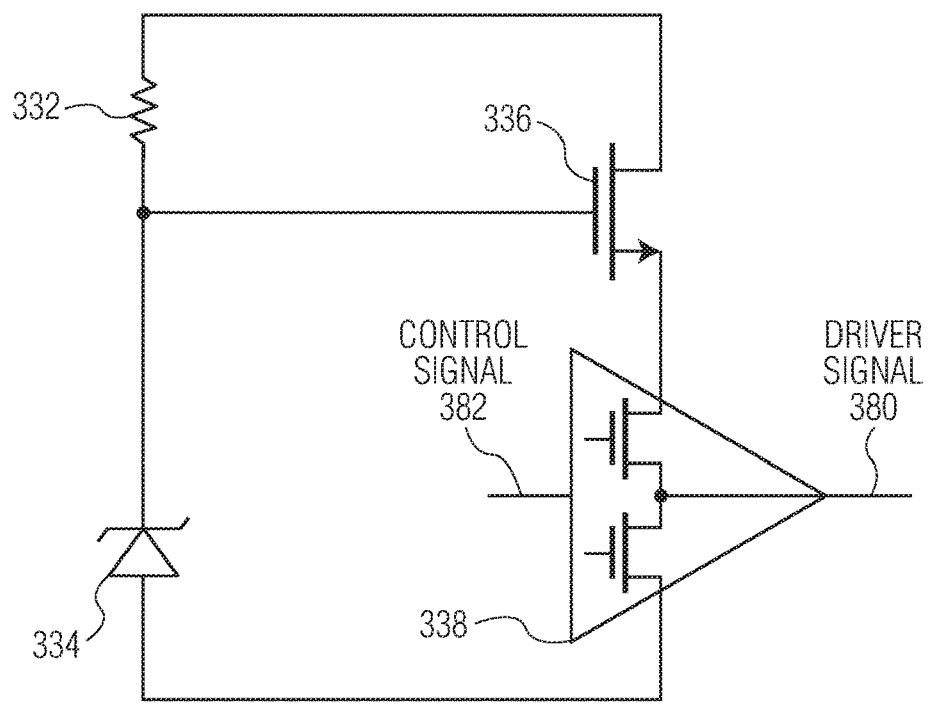
FIG. 3 depicts an embodiment of a voltage driver of the switched capacitor voltage converter depicted in FIG. 1.

FIG. 3 depicts a voltage driver 308, which is an embodiment of the voltage drivers 108-1, 108-2, 108-3, 108-4 depicted in FIG. 1. The voltage driver 308 depicted in FIG. 3 is one possible embodiment of the voltage drivers 108-1, 108-2, 108-3, 108-4 depicted in FIG. 1. However, the voltage drivers 108-1, 108-2, 108-3, 108-4 depicted in FIG. 1 are not limited to the embodiment shown in FIG. 3. In the embodiment depicted in FIG. 3, the voltage driver 308 includes a resistor 332, a Zener diode 334, an NMOS transistor 336, and a power field-effect transistor (FET) driver 338. The power FET driver can be implemented as a totem-pole driver. In some embodiments, the power FET driver includes multiple FETs electrically connected in series (stacked) or electrically connected in parallel with each other. The voltage driver is configured to generate a driver signal 380 in response to a control signal 382 based on a voltage signal 384, which can be the output voltage, $V_{CHARGE}$, which is generated by the voltage generator 106, the driver voltage, $V_{DR}$, or the input voltage, $V_{IN}$.

Turning back to FIG. 1, in an example operation of the switched capacitor voltage converter 100, the voltage conversion circuit 102 operates in two stages. In a first stage (i.e., the charging stage), the transistors, M2, M4, are turned on (i.e., conductive) and the transistors, M1, M3, are turned off (i.e., non-conductive). During the first stage, the voltage generator generates the output voltage, $V_{CHARGE}$, which is equivalent to the sum of half of the input voltage, $V_{IN}$, and the driver voltage, $V_{DR}$, and is used to charge the bootstrap capacitor, $C_{BST}$, and is applied to the voltage driver 108-1. In a second stage (i.e., the discharging stage), the transistors, M1, M3, are turned on (i.e., conductive) and the transistors, M2, M4, are turned off (i.e., non-conductive). During the second stage, the voltage generator does not operate and the bootstrap capacitor, $C_{BST}$, is discharged. The output voltage, $V_{CHARGE}$, is equivalent to the sum of the input voltage, $V_{IN}$, and the driver voltage, $V_{DR}$, and is applied to the voltage driver 108-1.

Figure 4:
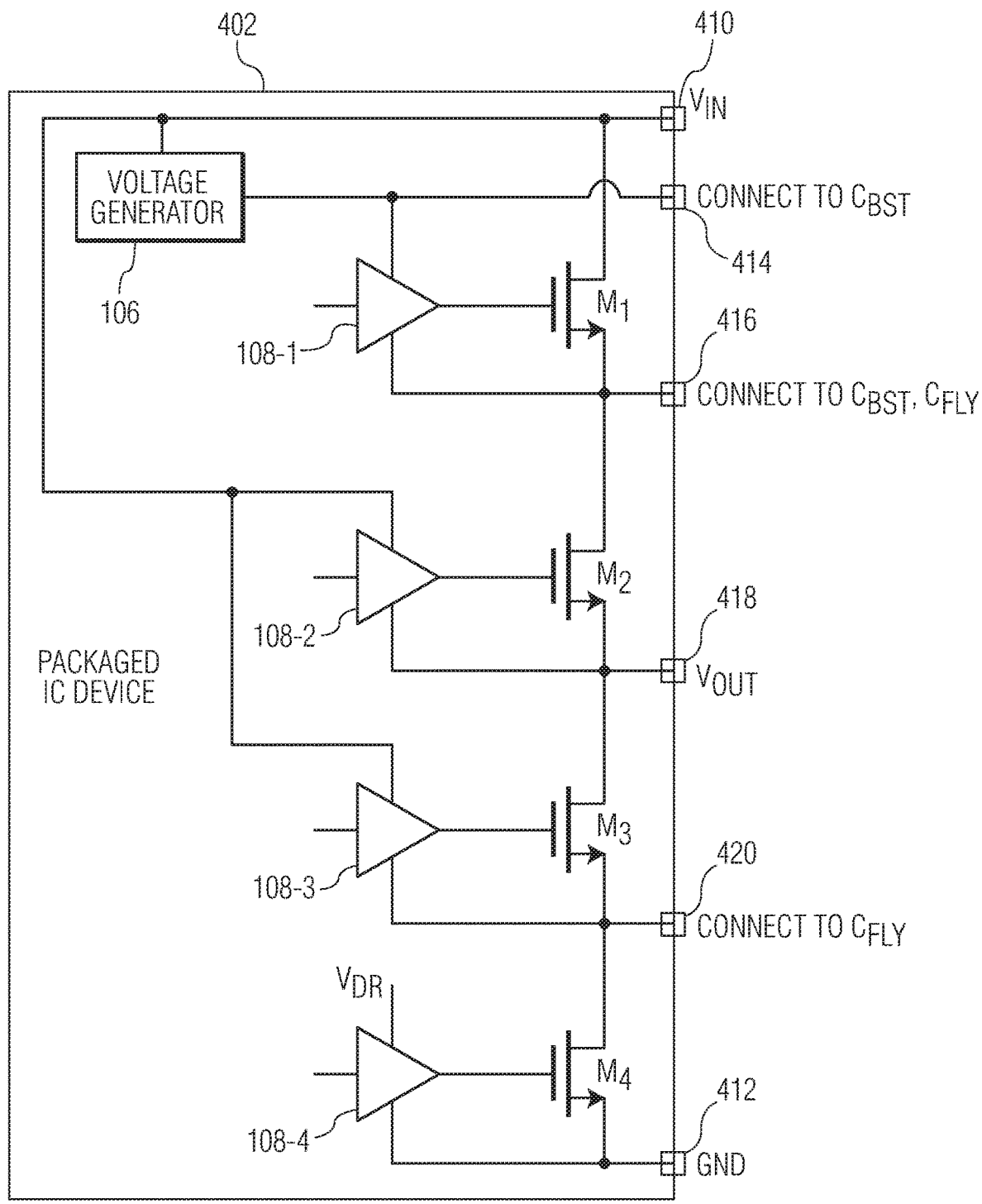
FIG. 4 depicts a voltage conversion circuit of the switched capacitor voltage converter depicted in FIG. 1 embodied as a packaged IC device.

For an N-phase (N being a positive integer) switched capacitor voltage converter in accordance with an embodiment of the invention, N bootstrap capacitors are used. Consequently, N terminals/pins are used for electrical connections between the N bootstrap capacitors and a packaged IC device of an N-phase voltage conversion circuit. For an N-phase voltage conversion circuit in which each switching device is electrically connected to a separate bootstrap capacitor, a total of 2N+1 terminals/pins are used, even if the middle bootstrap capacitor is reused. Consequently, compared to an N-phase voltage conversion circuit in which each switching device is electrically connected to a separate bootstrap capacitor, an N-phase (N being a positive integer) switched capacitor voltage converter in accordance with an embodiment of the invention uses N+1 less terminals/pins. FIG. 4 depicts the voltage conversion circuit 102 depicted in FIG. 1 embodied as a packaged IC device 402. The packaged IC device depicted in FIG. 4 is one possible packaged IC device of the voltage conversion circuit depicted in FIG. 1. However, the packaged IC device of the voltage conversion circuit depicted in FIG. 1 is not limited to the embodiment shown in FIG. 4. As shown in FIG. 4, the packaged IC device of the voltage conversion circuit includes six terminals/pins, a $V_{IN}$ (supply voltage) terminal/pin 410, a GND (ground) terminal/pin 412, a terminal/pin 414 that is electrically connectable to the bootstrap capacitor, $C_{BST}$, a terminal/pin 416 between the transistors, M1, M2, which is electrically connectable to the bootstrap capacitor, CBST, and to the flyover capacitor, $C_{FLY}$, a terminal/pin 418 between the transistors, M2, M3, which is electrically connectable to the output capacitor, $C_{OUT}$, and a terminal/pin 420 between the transistors, M3, M4, which is electrically connectable to the flyover capacitor, $C_{FLY}$. For a voltage conversion circuit in which each switching device is electrically connected to a separate bootstrap capacitor, a total of 8 terminals/pins are used. Consequently, compared to a voltage conversion circuit in which each switching device is electrically connected to a separate bootstrap capacitor, the voltage conversion circuit 102 depicted in FIG. 1 uses two less terminals/pins.

Figure 5:
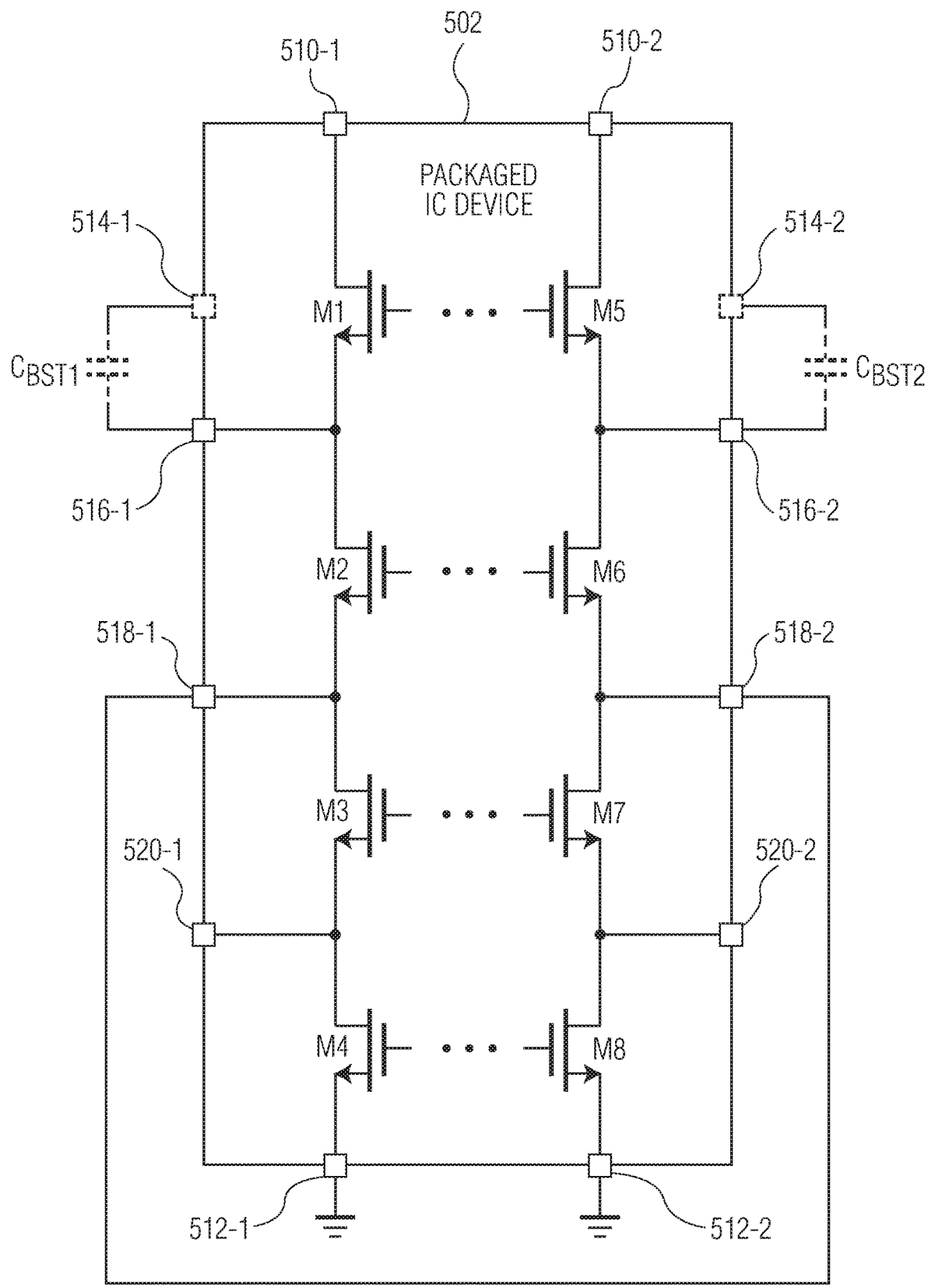
FIG. 5 depicts a terminal/pin configuration of a dual-phase voltage conversion circuit.

FIG. 5 depicts a terminal/pin configuration of a dual-phase voltage conversion circuit 502 embodied as a packaged IC device. As shown in FIG. 5, the packaged IC device of the dual-phase voltage conversion circuit includes twelve terminals/pins, two $V_{IN}$ (supply voltage) terminals/pins 510-1, 510-2, two GND (ground) terminals/pins 512-1, 512-2, a terminal/pin 514-1 that is electrically connectable to a bootstrap capacitor, $C_{BST1}$, a terminal/pin 516-1 between the transistors, M1, M2, which is electrically connectable to the bootstrap capacitor, $C_{BST1}$, and to a corresponding flyover capacitor, a terminal/pin 518-1 between the transistors, M2, M3, which is electrically connectable to a corresponding output capacitor, a terminal/pin 520-1 between the transistors, M3, M4, which is electrically connectable to the corresponding flyover capacitor, a terminal/pin 514-2 that is electrically connectable to a bootstrap capacitor, $C_{BST2}$, a terminal/pin 516-2 between the transistors, M5, M6, which is electrically connectable to the bootstrap capacitor, $C_{BST2}$, and to a corresponding flyover capacitor, a terminal/pin 518-2 between the transistors, M6, M7, which is electrically connectable to a corresponding output capacitor, and a terminal/pin 520-2 between the transistors, M7, M8, which is electrically connectable to the corresponding flyover capacitor. For a dual-phase voltage conversion circuit in which each switching device is electrically connected to a separate bootstrap capacitor, a total of fifteen terminals/pins are used, even if the middle bootstrap capacitor is reused. Consequently, compared to a dual-phase voltage conversion circuit in which each switching device is electrically connected to a separate bootstrap capacitor, the dual-phase voltage conversion circuit depicted in FIG. 5 uses three less terminals/pins.

Figure 6:
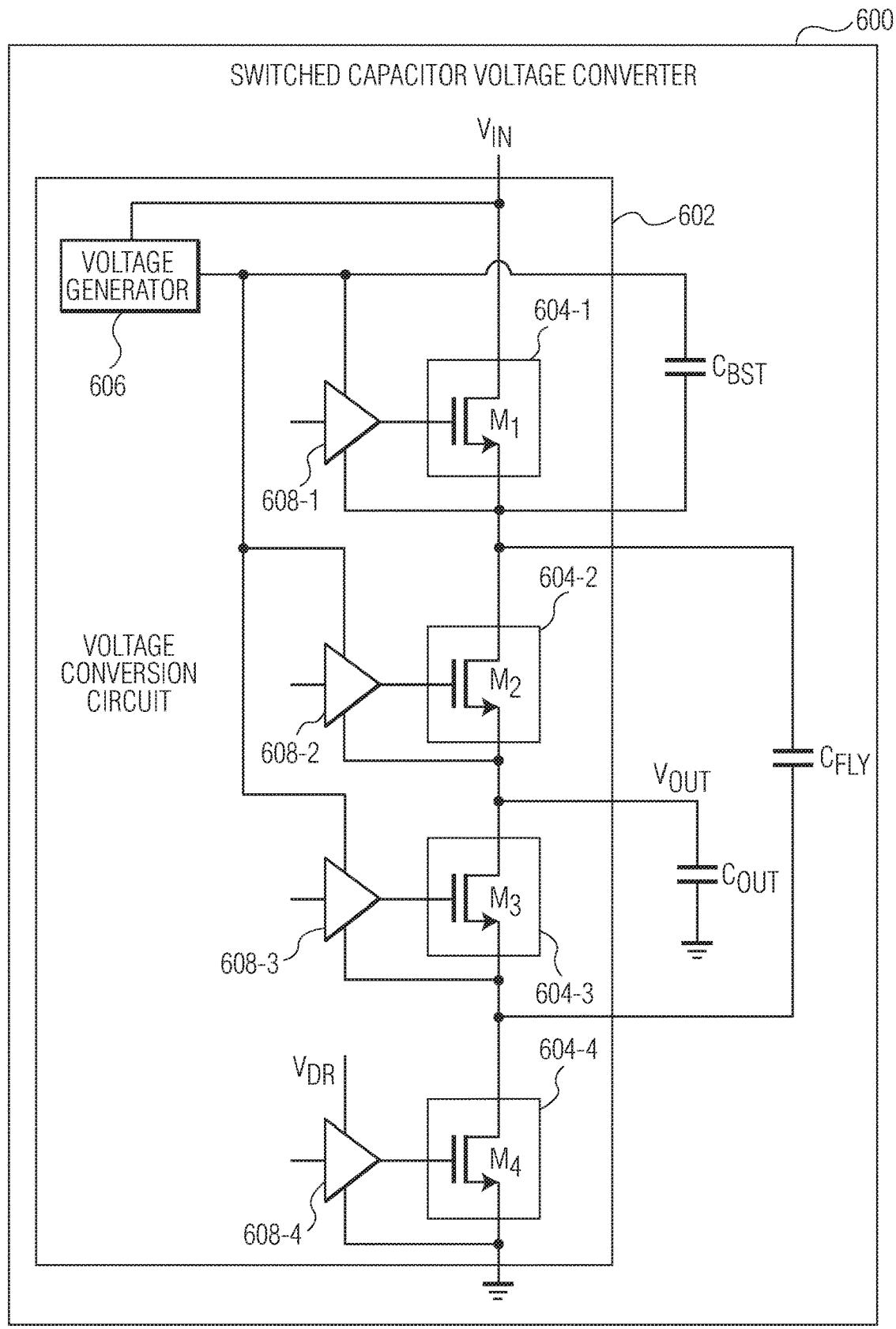
FIG. 6 is a schematic block diagram of a switched capacitor voltage converter in accordance with a second embodiment of the invention.

FIG. 6 is a schematic block diagram of a switched capacitor voltage converter 600 in accordance with a second embodiment of the invention. In the embodiment depicted in FIG. 6, the switched capacitor voltage converter includes a voltage conversion circuit 602, which includes serially connected switching devices 604-1, 604-2, 604-3, 604-4 that are implemented by transistors, M1, M2, M3, M4, a voltage generator 606 connected to the serially connected switching devices, and voltage drivers 608-1, 608-2, 608-3, 608-4, a bootstrap capacitor, $C_{BST}$, a flyover capacitor, $C_{FLY}$, and an output capacitor, $C_{OUT}$. The voltage conversion circuit 602, the switching devices 604-1, 604-2, 604-3, 604-4, the voltage generator 606, and the voltage drivers 608-1, 608-2, 608-3, 608-4 in the embodiment depicted in FIG. 6 are similar to or the same as the voltage conversion circuit 102, the switching devices 104-1, 104-2, 104-3, 104-4, the voltage generator 106, and the voltage drivers 108-1, 108-2, 108-3, 108-4 in the embodiment depicted in FIG. 1. A difference between the switched capacitor voltage converter 600 depicted in FIG. 6 and the switched capacitor voltage converter 100 depicted in FIG. 1 is that the switching devices 604-2, 604-3 are supplied by the voltage generator 606.

In an example operation of the switched capacitor voltage converter 600, the voltage conversion circuit 602 operates in two stages. In a first stage (i.e., the charging stage), the transistors, M2, M4, are turned on (i.e., conductive) and the transistors, M1, M3, are turned off (i.e., non-conductive). During the first stage, the voltage generator generates the output voltage, $V_{CHARGE}$, which is equivalent to the sum of half of the input voltage, $V_{IN}$, and the driver voltage, $V_{DR}$, and is used to charge the bootstrap capacitor, $C_{BST}$, and is applied to the voltage drivers 608-1, 608-2, 608-3 In a second stage (i.e., the discharging stage), the transistors, M1, M3, are turned on (i.e., conductive) and the transistors, M2, M4, are turned off (i.e., non-conductive). During the second stage, the voltage generator does not operate and the bootstrap capacitor, $C_{BST}$, is discharged. The voltage, $V_{CHARGE}$, is equivalent to the sum of the input voltage, $V_{IN}$, and a driver voltage, $V_{DR}$, and is applied to the voltage drivers 608-1, 608-2, 608-3.

Figure 7:
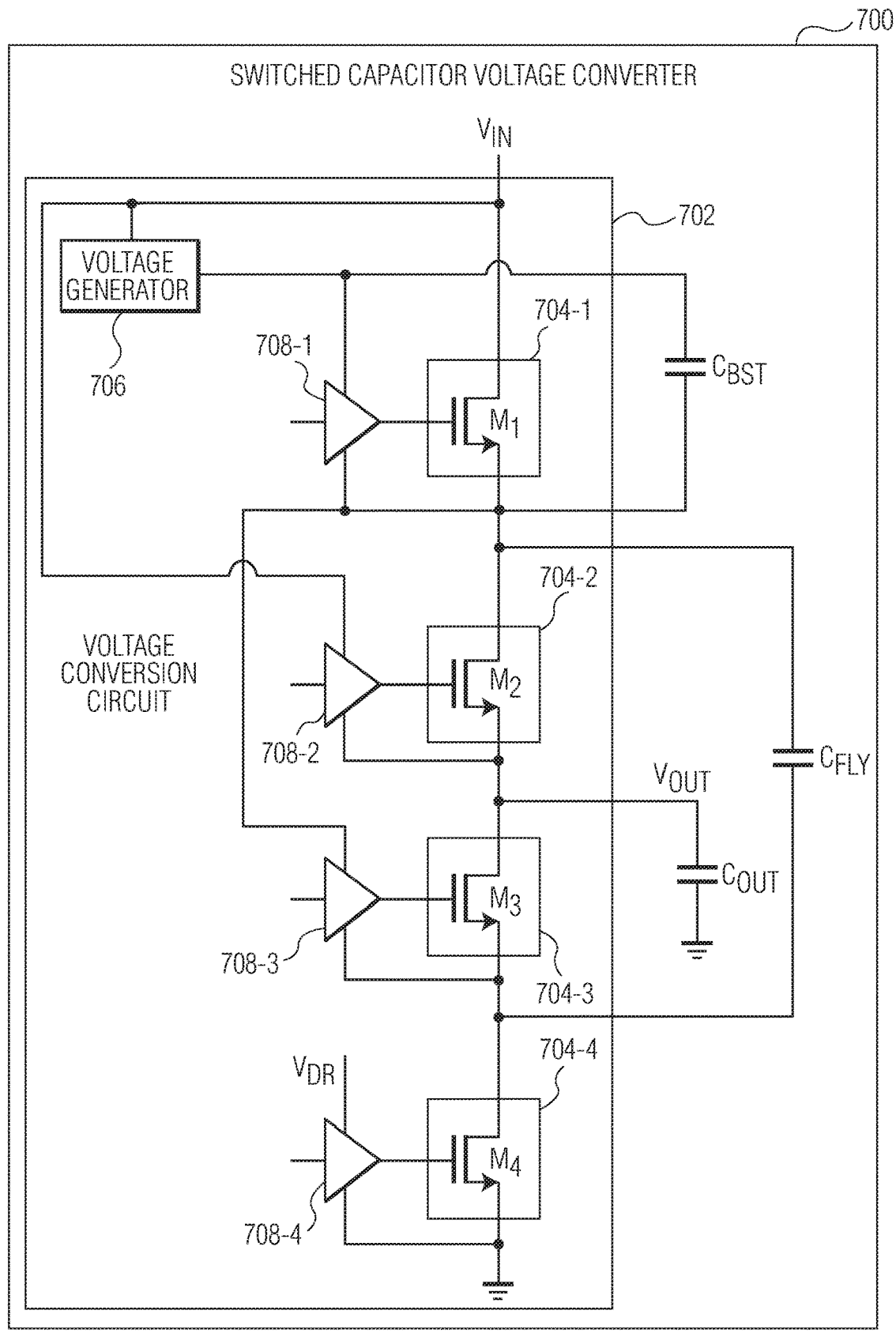
FIG. 7 is a schematic block diagram of a switched capacitor voltage converter in accordance with a third embodiment of the invention.

FIG. 7 is a schematic block diagram of a switched capacitor voltage converter 700 in accordance with a third embodiment of the invention. In the embodiment depicted in FIG. 7, the switched capacitor voltage converter includes a voltage conversion circuit 702, which includes serially connected switching devices 704-1, 704-2, 704-3, 704-4 that are implemented by transistors, M1, M2, M3, M4, a voltage generator 706 connected to the serially connected switching devices, and voltage drivers 708-1, 708-2, 708-3, 708-4, a bootstrap capacitor, $C_{BST}$, a flyover capacitor, $C_{FLY}$, and an output capacitor, $C_{OUT}$. The voltage conversion circuit 702, the switching devices 704-1, 704-2, 704-3, 704-4, the voltage generator 706, and the voltage drivers 708-1, 708-2, 708-3, 708-4 in the embodiment depicted in FIG. 7 are similar to or the same as the voltage conversion circuit 102, the switching devices 104-1, 104-2, 104-3, 104-4, the voltage generator 106, and the voltage drivers 108-1, 108-2, 108-3, 108-4 in the embodiment depicted in FIG. 1. A difference between the switched capacitor voltage converter 700 depicted in FIG. 7 and the switched capacitor voltage converter 100 depicted in FIG. 1 is that the switching device 704-3 is supplied by a voltage at a terminal/pin that is between the switching devices 704-2, 704-3.

In an example operation of the switched capacitor voltage converter 700, the voltage conversion circuit 702 operates in two stages. In a first stage (i.e., the charging stage), the transistors, M2, M4, are turned on (i.e., conductive) and the transistors, M1, M3, are turned off (i.e., non-conductive). During the first stage, the voltage generator generates the output voltage, $V_{CHARGE}$, which is equivalent to the sum of half of the input voltage, $V_{IN}$, and the driver voltage, $V_{DR}$, and is used to charge the bootstrap capacitor, $C_{BST}$, and is applied to the voltage driver 708-1. In a second stage (i.e., the discharging stage), the transistors, M1, M3, are turned on (i.e., conductive) and the transistors, M2, M4, are turned off (i.e., non-conductive). During the second stage, the voltage generator does not operate and the bootstrap capacitor, $C_{BST}$, is discharged. The voltage, $V_{CHARGE}$, is equivalent to the sum of the input voltage, $V_{IN}$, and a driver voltage, $V_{DR}$, and is applied to the voltage driver 708-1

Figure 8:
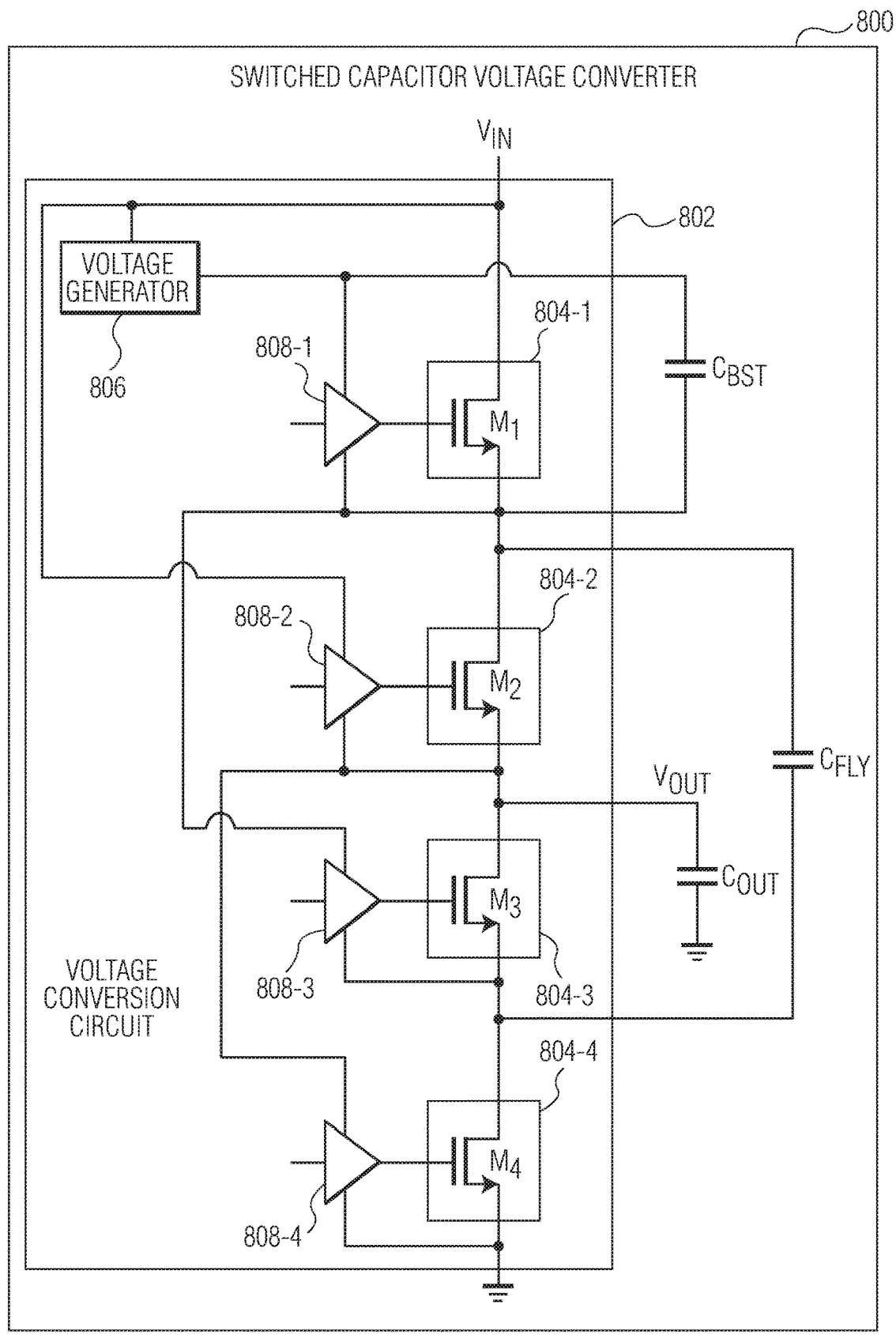
FIG. 8 is a schematic block diagram of a switched capacitor voltage converter in accordance with a four embodiment of the invention.

FIG. 8 is a schematic block diagram of a switched capacitor voltage converter 800 in accordance with a fourth embodiment of the invention. In the embodiment depicted in FIG. 8, the switched capacitor voltage converter includes a voltage conversion circuit 802, which includes serially connected switching devices 804-1, 804-2, 804-3, 804-4 that are implemented by transistors, M1, M2, M3, M4, a voltage generator 806 connected to the serially connected switching devices, and voltage drivers 808-1, 808-2, 808-3, 808-4, a bootstrap capacitor, $C_{BST}$, a flyover capacitor, $C_{FLY}$, and an output capacitor, $C_{OUT}$. The voltage conversion circuit 802, the switching devices 804-1, 804-2, 804-3, 804-4, the voltage generator 806, and the voltage drivers 808-1, 808-2, 808-3, 808-4 in the embodiment depicted in FIG. 8 are similar to or the same as the voltage conversion circuit 102, the switching devices 104-1, 104-2, 104-3, 104-4, the voltage generator 106, and the voltage drivers 108-1, 108-2, 108-3, 108-4 in the embodiment depicted in FIG. 1. A difference between the switched capacitor voltage converter 800 depicted in FIG. 8 and the switched capacitor voltage converter 700 depicted in FIG. 7 is that the switching device 804-4 is supplied by a voltage at a terminal/pin that is between the switching devices 804-3, 804-4.

In an example operation of the switched capacitor voltage converter 800, the voltage conversion circuit 802 operates in two stages. In a first stage (i.e., the charging stage), the transistors, M2, M4, are turned on (i.e., conductive) and the transistors, M1, M3, are turned off (i.e., non-conductive). During the first stage, the voltage generator generates the output voltage, $V_{CHARGE}$, which is equivalent to the sum of half of the input voltage, $V_{IN}$, and the driver voltage, $V_{DR}$, and is used to charge the bootstrap capacitor, $C_{BST}$, and is applied to the voltage driver 808-1. In a second stage (i.e., the discharging stage), the transistors, M1, M3, are turned on (i.e., conductive) and the transistors, M2, M4, are turned off (i.e., non-conductive). During the second stage, the voltage generator does not operate and the bootstrap capacitor, $C_{BST}$, is discharged. The voltage, $V_{CHARGE}$, is equivalent to the sum of the input voltage, $V_{IN}$, and a driver voltage, $V_{DR}$, and is applied to the voltage driver 808-1.

Figure 9:
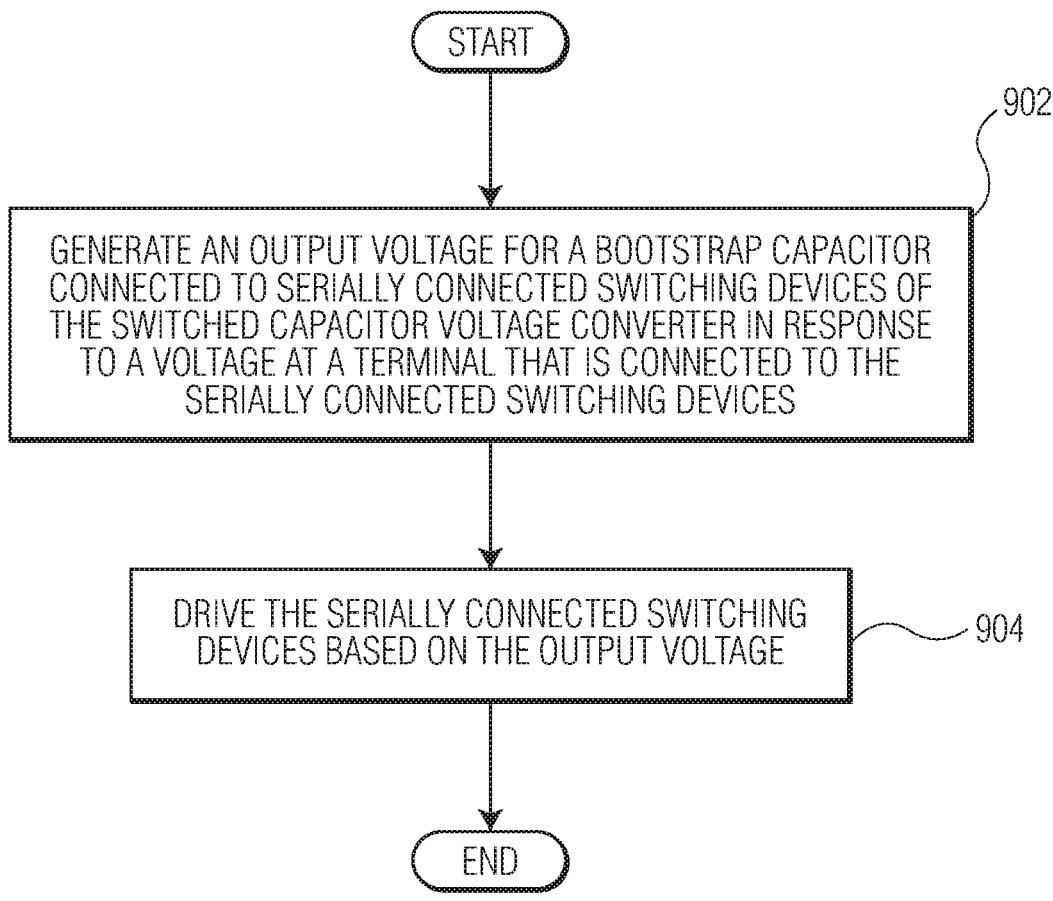
FIG. 9 is a process flow diagram of a method for operating a switched capacitor voltage converter in accordance with an embodiment of the invention.

FIG. 9 is a process flow diagram of a method for operating a switched capacitor voltage converter in accordance with an embodiment of the invention. At block 902, an output voltage for a bootstrap capacitor connected to serially connected switching devices of the switched capacitor voltage converter is generated in response to a voltage at a terminal that is connected to the serially connected switching devices. At block 904, the serially connected switching devices are driven based on the output voltage. The switched capacitor voltage converter may be the same as or similar to switched capacitor voltage converters depicted in FIGS. 1-8.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods described herein may be implemented using software instructions stored on a computer useable storage medium for execution by a computer. As an example, an embodiment of a computer program product includes a computer useable storage medium to store a computer readable program. The computer-useable or computer-readable storage medium can be an electronic, magnetic, optical, electromagnetic, infrared, or semiconductor system (or apparatus or device). Examples of non-transitory computer-useable and computer-readable storage media include a semiconductor or solid state memory, magnetic tape, a removable computer diskette, a random access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Alternatively, embodiments of the invention may be implemented entirely in hardware or in an implementation containing both hardware and software elements. In embodiments which use software, the software may include but is not limited to firmware, resident software, microcode, etc.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:
1. A switched capacitor voltage converter, the switched capacitor voltage converter comprising:
    a plurality of serially connected switching devices;

a voltage generator connected to the serially connected switching devices and configured to generate an output voltage for a bootstrap capacitor in response to a first voltage at a first terminal that is connected to the serially connected switching devices; and a plurality of voltage drivers configured to drive the serially connected switching devices based on the output voltage and another voltage that is derived from the first voltage.

2. The switched capacitor voltage converter of claim 1, wherein the voltage drivers comprise:

a first voltage driver configured to drive a first switching device of the serially connected switching devices based on the output voltage;

second and third voltage drivers configured to drive second and third switching devices of the serially connected switching devices based on the first voltage; and a fourth voltage driver configured to drive a fourth switching device of the serially connected switching devices based on a second voltage that is derived from the first voltage.

3. The switched capacitor voltage converter of claim 2, wherein the first, second, third, and fourth voltage drivers are connected to gate terminals of the first, second, third, and fourth switching devices respectively.

4. The switched capacitor voltage converter of claim 2, wherein the switched capacitor voltage converter comprises the bootstrap capacitor.

5. The switched capacitor voltage converter of claim 4, wherein the bootstrap capacitor is connected:

to a second terminal connected to the voltage generator and to the first voltage driver; and to a third terminal connected to a source terminal of the first switching device and to a drain terminal of the second switch device.

6. The switched capacitor voltage converter of claim 1, wherein the voltage drivers comprise:

first, second, and third voltage drivers configured to drive first, second and third switching devices of the serially connected switching devices based on the output voltage; and a fourth voltage driver configured to drive a fourth switching device of the serially connected switching devices based on a second voltage that is derived from the first voltage.

7. The switched capacitor voltage converter of claim 6, wherein the first, second, third, and fourth voltage drivers are connected to gate terminals of the first, second, third, and fourth switching devices respectively.

8. The switched capacitor voltage converter of claim 6, wherein the switched capacitor voltage converter comprises the bootstrap capacitor.

9. The switched capacitor voltage converter of claim 8, wherein the bootstrap capacitor is connected:

to a second terminal connected to the voltage generator and to the first voltage driver; and to a third terminal connected to a source terminal of the first switching device and to a drain terminal of the second switch device.

10. The switched capacitor voltage converter of claim 1, wherein the voltage drivers comprise:

a first voltage driver configured to drive a first switching device of the serially connected switching devices based on the output voltage;

a second voltage driver configured to drive a second switching device of the serially connected switching devices based on the first voltage;

a third voltage driver configured to drive a third switching device of the serially connected switching devices based on a second voltage that is derived from the first voltage; and a fourth voltage driver configured to drive a fourth switching device of the serially connected switching devices based on a third voltage that is derived from the first voltage.

11. The switched capacitor voltage converter of claim 10, wherein the third voltage is an output voltage of the switched capacitor voltage converter.

12. The switched capacitor voltage converter of claim 10, wherein the first, second, third, and fourth voltage drivers are connected to gate terminals of the first, second, third, and fourth switching devices respectively.

13. The switched capacitor voltage converter of claim 10, wherein the switched capacitor voltage converter comprises the bootstrap capacitor.

14. The switched capacitor voltage converter of claim 13, wherein the bootstrap capacitor is connected:

to a second terminal connected to the voltage generator and to the first voltage driver; and to a third terminal connected to a source terminal of the first switching device and to a drain terminal of the second switch device.

15. The switched capacitor voltage converter of claim 1, wherein the voltage generator comprises a voltage limiter and a diode.

16. A switched capacitor voltage converter, the switched capacitor voltage converter comprising:

a plurality of serially connected N-type transistors;

a bootstrap capacitor connected to a first N-type transistor of the serially connected N-type transistors;

a voltage generator connected to the serially connected N-type transistors and to the bootstrap capacitor and configured to generate an output voltage for the bootstrap capacitor in response to a first voltage at a first terminal that is connected to the serially connected N-type transistors; and a plurality of voltage drivers configured to drive the serially connected N-type transistors based on the output voltage and another voltage that is derived from the first voltage, wherein the voltage drivers comprise a first voltage driver configured to drive the first N-type transistor based on the output voltage.

17. The switched capacitor voltage converter of claim 16, wherein the voltage drivers comprises:

second and third voltage drivers configured to drive second and third N-type transistors of the serially connected N-type transistors based on the first voltage; and a fourth voltage driver configured to drive a fourth N-type transistor of the serially connected N-type transistors based on a second voltage that is derived from the first voltage.

18. The switched capacitor voltage converter of claim 16, wherein the voltage drivers comprise:

second and third voltage drivers configured to drive second and third N-type transistors of the serially connected N-type transistors based on the output voltage; and a fourth voltage driver configured to drive a fourth N-type transistor of the serially connected N-type transistors based on a second voltage that is derived from the first voltage.

19. The switched capacitor voltage converter of claim 16, wherein the voltage drivers comprise:
- a second voltage driver configured to drive a second N-type transistor of the serially connected N-type transistors based on the first voltage;
- a third voltage driver configured to drive a third N-type transistor of the serially connected N-type transistors based on a second voltage that is derived from the first voltage; and
- a fourth voltage driver configured to drive a fourth N-type transistor of the serially connected N-type transistors based on a third voltage that is derived from the first voltage.

20. A method for operating a switched capacitor voltage converter, the method comprising: generating an output voltage for a bootstrap capacitor connected to a plurality of serially connected switching devices of the switched capacitor voltage converter in response to a first voltage at a first terminal that is connected to the serially connected switching devices; and driving the serially connected switching devices based on the output voltage and another voltage that is derived from the first voltage.

* * * * *